United States Patent [19]

Henslin

[11] 4,359,099

[45] Nov. 16, 1982

[54] PORTABLE ANIMAL WEIGHING CART

[76] Inventor: William Henslin, Rte. 2, Box 112, Dodge Center, Minn. 55927

[21] Appl. No.: 216,270

[22] Filed: Dec. 15, 1980

[51] Int. Cl.³ .............................................. G01G 17/08
[52] U.S. Cl. .................................. 177/140; 177/211; 177/256
[58] Field of Search ......... 177/136, 211, 256, DIG. 9, 177/140, 245

[56] References Cited

U.S. PATENT DOCUMENTS

| | | | |
|---|---|---|---|
| 2,736,549 | 2/1956 | Paul | 177/128 |
| 2,961,231 | 11/1960 | Kucera | 177/230 |
| 3,074,497 | 1/1963 | Hawbaker | 177/140 X |
| 3,599,739 | 8/1971 | Hyer | 177/211 |
| 3,666,032 | 5/1972 | Maffia | 177/256 |
| 4,138,968 | 2/1979 | Ostermann | 177/145 X |

OTHER PUBLICATIONS

Salter Industrial Measurement Limited, England, Spec. Sheets For Models 2G100, 235-6, DR-525, New Product.

Primary Examiner—Joseph W. Hartary
Attorney, Agent, or Firm—Jacobson and Johnson

[57] ABSTRACT

A cart for weighing small animals with the cart having a torsional undercarriage mechanism that directs the weight of an animal in a weighing pen through a single tension support member wherein the elastic deformation of the single tension support member is measured with an electrical resistance strain gauge mounted on the tension support member and a conventional digital strain gauge read-out device.

3 Claims, 3 Drawing Figures

PORTABLE ANIMAL WEIGHING CART

BACKGROUND OF THE INVENTION

1. Field of the Invention

This invention relates generally to weighing carts and, more specifically, to portable weighing cart for weighing live animals.

The concept of weighing devices is old in the art with the types of weighing devices ranging from very simple devices to very sophisticated devices. Although there are a plethora of weighing devices available, there is no suitable device to solve the unique problems that have developed with the application of scientific principals to raising of small animals. For example, raising of animals such as pigs requires careful monitoring of the feed and weight of each individual animal in order for the farmer to select the pigs which produce the most rapid weight gains. Weighing begins at birth when the pigs are small and continues as the pigs gain weight. As a farmer may have many littering pens, it is often necessary to move the weighing device from one littering pen to another. In addition, the weighing device must accurately weigh small animals as well as being subject to the environmental conditions encountered in a pig raising operation. A further problem is that small animals usually will not hold still for weighing. The present invention provides a portable, accurate weighing cart that can weight live animals even though the animal may wander in the weighing pen. In addition, the weight scale functions as a cart that permits easy movement from one area to another.

2. Description of the Prior Art

The Dale U.S Pat. No. 3,181,635 shows a concept of a portable scale with a flat platform.

The Gray U.S. Pat. No. 3,191,701 shows a portable weighing apparatus using fluid load cells for weighing trucks of the like.

The English, et al. U.S. Pat. No. 3,949,822 shows a vehicle wheel weighing system device using a strain gauge network for weighing trucks by measuring the weight on a number of scales.

The Mitchell, et al. U.S. Pat. No. 314,599 shows an early version of a weighing scale which weighs an object regardless of its location on the scale.

The Miller U.S. Pat. No. 618,893 shows a combination scoop and scale with a scoop centrally supported by a spiral spring weighing device.

More current prior art devices are shown in the attached technical specification sheets of the Salter Industrial Measurement Limited of England.

Salter specification sheet (Model 2G100) shows an electronic weight head for use as an animal weighing scale for large animals wherein an animal cage and the animal are suspended from an arm hanging below the scale.

Salter specification sheet (Model 235-6) shows a number of suspended weighing systems having a single axis weighing unit.

Salter new product information bulletin shows a washable nylon baby weigh sling for use with a spring suspension scale.

Salter specification sheet (Model DR-525) shows an electronic flexure base scale which uses a single load cell and stainless steel flexure located at the corners of the frame. A pivot arm connected to one side where an off-centered positioned load cell measures the weight of an object through a digital weight meter.

A review of these prior art devices reveal that none of the prior art devices provide the farmer with a portable, accurate weighing device for weighing small live animals, particularly animals that may move around.

SUMMARY OF THE INVENTION

Briefly, the invention comprises a portable weighing cart that can be transported from one area to another with a weighing mechanism incorporated in the cart. The weighing mechanism comprises a torsional undercarriage that forms a link between a main support frame and the weighing pen with the torsional undercarriage directing the downward forces from weighing an animal through a single tension member. The undercarriage connects to the frame and cart through bearing supports with the undercarriage and frame restrained from displacement motion relative to one another. A strain gauge and strain gauge read-out device provide a visual indication of the weight of an animal in the weighing pen.

DESCRIPTION OF THE PREFERRED EMBODIMENT

Figure 1:
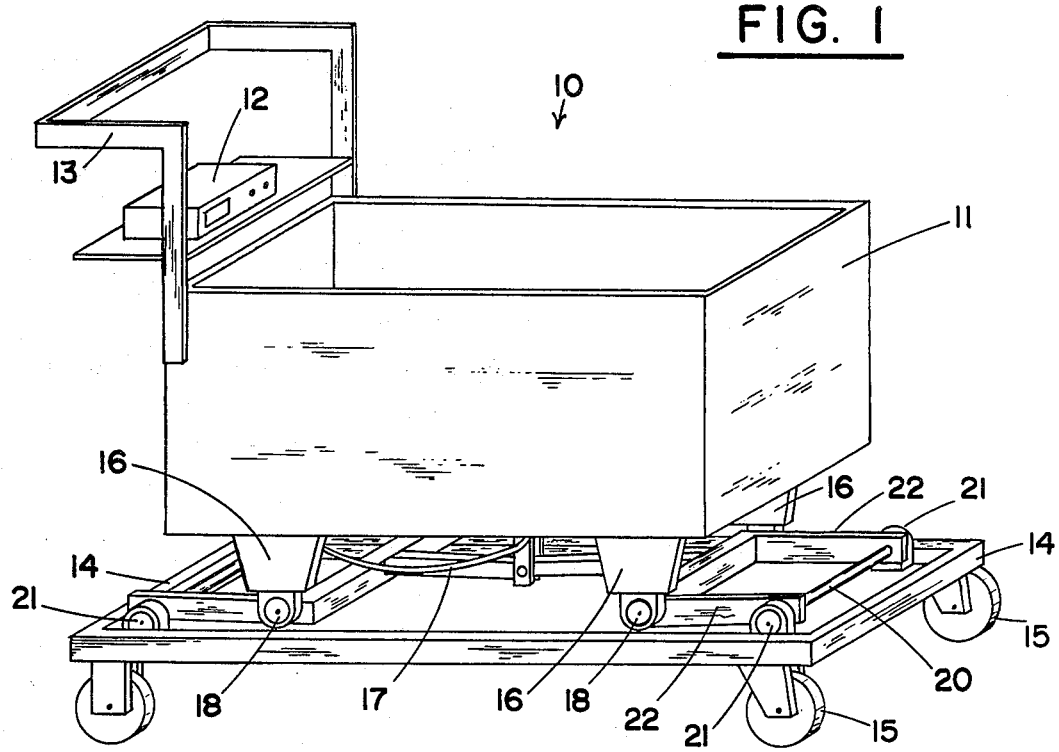
FIG. 1 is a pictorial view of my portable weighing cart.

Referring to FIG. 1, reference numeral 10 generally designates my portable animal weighing cart having a high walled pen 11 for placing small animals therein. The pen walls are sufficiently high to prevent an animal from jumping out of pen 11. Pen 11 is mounted on a main support frame 14 having rollers 15 thereon. A handle 13 located on the top of pen 11 provides means for pushing or pulling weighing cart 10 from one location to another. Located beneath pen 11 is a torsional undercarriage that transmits the weight of an object in the pen to a single tension support member fastened to the bottom of pen 11. Located at the bottom corners of pen 11 are members 16 which contain bearings therein. Rotatably journaled in the bearings in members 16 are cross members 18 and extending outward from cross members 18 are members 22 which are rotatably mounted in bearings 21 through shaft 20. The bearing members shown are of the type that mount securely to one surface and contain a rotatable central member to provide low frictional resistance to rotation of either shaft 20 or shaft 18; however, as will be described herein, there is very little rotation of any of the shafts journaled in the bearings.

Figure 2:
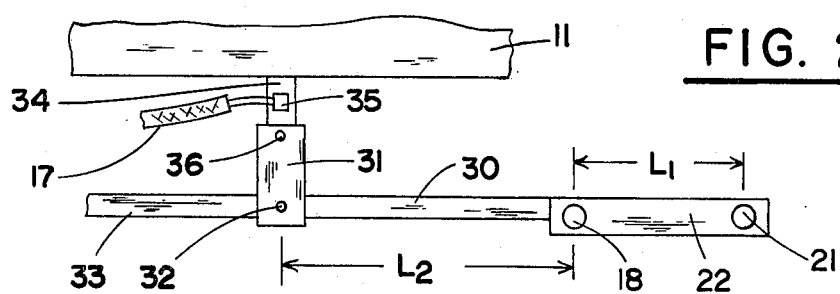
FIG. 2 is a partial view of the torsional undercarriage.

FIG. 2 shows a side view of the details of one side of the torsional undercarriage linkage that supports pen 11 above frame 14. Reference numeral 22 identifies the outward member of length $L_1$ which is rigidly connected to member 30 of length $L_2$ to form a first lever arm. Similarly, there is another vertical half-linkage located on the other side of cart 10 which has a member 33 that connects to member 30 to form a second lever arm. Arrows of force, $F_1$, $F_2$ and $F_3$, are shown to indicate the forces acting on the right half of the torsional undercarriage mechanism. Force $F_1$ is the upward force that supports pen 11 above frame 14 and is transmitted through outer bearings 21, i.e., this is the end point of support of the torsional undercarriage mechanism on frame 14. Similarly, the left side of the torsional undercarriage mechanism is supported in an identical manner. $F_2$ designates the right side downward force produced by the weight of the pen 11 and the contents of pen 11. $F_3$ represents the total tension force on member 34 produced by the force generated by the right side counterclockwise torque about right side bearings 18 produced by $F_2$ about $F_1$ and the left side clockwise torque produced by a similar force about the left side bearing 18.

Figure 3:
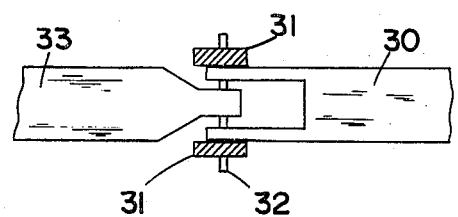
FIG. 3 is a top sectional view of the connecting mechanism in the torsional undercarriage.

As can be seen from FIG. 2 and FIG. 3, member 30 and members 22 coact to form a Y-shaped structure on the right side of pen 11 and similarly member 33 coacts with cross members on the opposite side to form a Y-shaped structure on the left side of pen 11. The end of member 30 connects to yoke member 31 through a connecting rod 32. Similarly, the end of member 33 connects to yoke member 31 also through connecting rod 32. Yoke member 31 connects to one end of a tension support member 34 through a similar connecting rod 36. FIG. 3 shows a top view of yoke 31 and the pivotal dovetail relationship of members 30 and 33. One end of tension support member 34 fastens securely to the bottom of pen 11 with the other end fastened to yoke 31. Located on tension support member 34 is a strain gauge 35 which connects to an electronic digital read-out device 12. Strain gauges are known in the art and comprise an electrical resistance which is fixed firmly to an object to expand and contract as the object is stressed. The displacement results in a change in strain gauge electrical resistance which can be converted to a weight read-out through available electronic instruments.

To more fully understand the operation and use of my invention, reference should be made to FIG. 1. A farmer grasps handle 13 and wheels cart 10 proximate the farrowing pen. Next, the operator turns on the electronic digital read-out 12 which provides a visual indication of the weight of objects in pen 11. Next, the farmer places a small animal such as a pig in pen 11. The weight of the pig increases the right side downward force $F_2$ through right side members 16 and right side bearings 18 and a similar downward force through left side members 16 and left side bearings 18. However, members 30 and 33 are mechanically restrained from downward motion through yoke 31 and tension support member 34 which is rigidly connected to the bottom of pen 11, i.e., support members 16 acting on members 18 prevent downward motion of pen 11. This restraining produces a single tension $F_1$ as a result of torques produced by downward forces on opposite sides of frame 14. Bearings 18 and 21 have been provided to permit slight downward rotation of member 33 and member 30, FIG. 2. However, in view of the position and location of member 16, arms 33 and 30 are effectively restrained from downward movement by yoke 31 and tension support member 34 which attaches to the bottom of pen 11. It is apparent that members 33 and 30 cannot rotate downward and form part of a rigid structure; however, although pen 11 is not free to be displaced downward, the torque produced on members 30 and 33 produce a downward force on member 34. As pen 11 is restrained from downward movement, it is apparent that tension support member 34 is placed in tension in direct proportion to the weight of an animal in pen 11. The tension force in member 34 produces an elastic elongation of tension support member 34 which is measured by a single strain gauge 35 which is centrally located on the undercarriage of cart 10. A lead 17 connects strain gauge 35 to a visual digital read-out device.

It will thus be appreciated that the weighing unit comprises a fully restrained undercarriage which is sufficiently rigid so that cart 10 can be moved from one place to another as if it were a solid support cart with no weighing mechanism.

It has been found that the present arrangement provides measurement by the weight of the animal regardless of the location of the animal in pen 11 through a single tension member 34. Furthermore, the bearings members provide very low frictional resistance thereby minimizing hysteresis losses associated with flexible support. While the weighing unit can weigh small animals to within a tenth of a pound, the unit is also very rugged since the undercarriage and pen 11 are joined together in a single unit.

To scale the sensitivity of the weighing cart, the distances $L_1$ and $L_2$ can be varied with an increase in $L_2$ and corresponding decrease in $L_1$ producing a less sensitive unit and a decrease in $L_2$ and a corresponding increase in $L_1$ producing a more sensitive weighing unit.

I claim:

1. A combination cart and weighing device having a weighing pen;
    said weighing pen having an opening in the top to place an animal therein and sufficiently high sides to prevent an animal from jumping out of said weighing pen;
    said weighing pen having a plurality of first members attached to said weighing pen for transmitting a downward force;
    a support frame, said support frame having a first end and a second end and means thereon to permit movement of said cart and weighing device from one location to another;
    a torsional support system having a plurality of bearing members on each end of said torsional support system with said plurality of bearing members pivotally connecting said support frame to said torsional support system, said torsional support system including a first half-linkage mounted on said first end of said support frame and a second half-linkage mounted on said second end of said support frame with said first half-linkage connected to said second half-linkage and said first half-linkage and said second half-linkage extending from said first end of said support frame to said second end of said support frame;
    a tension member located intermediate said first end of said support frame and said second end of said support frame, said tension member connected to said weighing pen and to said first half-linkage and said second half-linkage so that when an animal is placed in said weighing pen the weight of the animal provides a downward force on each of said first half-linkage and said second half-linkage through said bearing members to thereby provide a tension force on said tension member in proportion to the weight of the animal in said weighing pen while providing a rigid structure to support the use of said combination cart and weighing device as either a cart or a weighing device; and
    means mounted on said tension member to measure the strain on said tension member to thereby provide a signal corresponding to the weight of an animal in said weighing pen.

2. The invention of claim 1 including a visual read-out device responsive to the signal produced by the strain on said tension member.

3. The invention of claim 1 wherein said weighing pen includes a handle for pushing or pulling said weighing pen and said means on said support frame comprises wheels to permit said weighing cart to be moved about.

* * * * *